May 26, 1925. Re. 16,082

A. MADSON

SHOE AND METHOD OF MAKING THE SAME

Original Filed Nov. 26, 1917 2 Sheets-Sheet 1

Inventor:
AMOS MADSON,
By John H. Bruninga
His Attorney.

May 26, 1925. Re. 16,082
A. MADSON
SHOE AND METHOD OF MAKING THE SAME
Original Filed Nov. 26, 1917 2 Sheets-Sheet 2
Fig. 5.
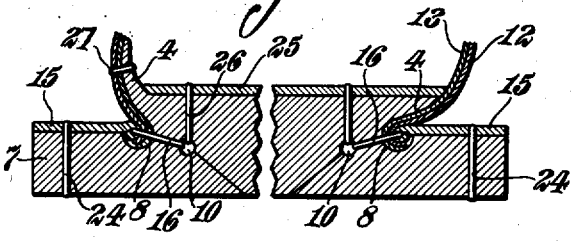
Fig. 6.
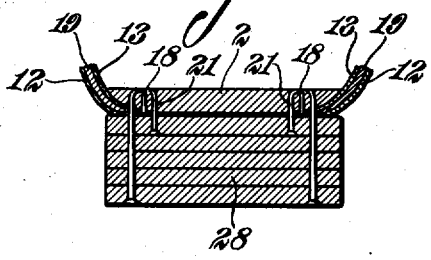
Fig. 8.
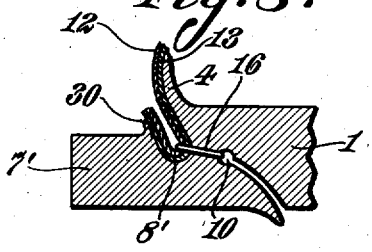
Fig. 7.
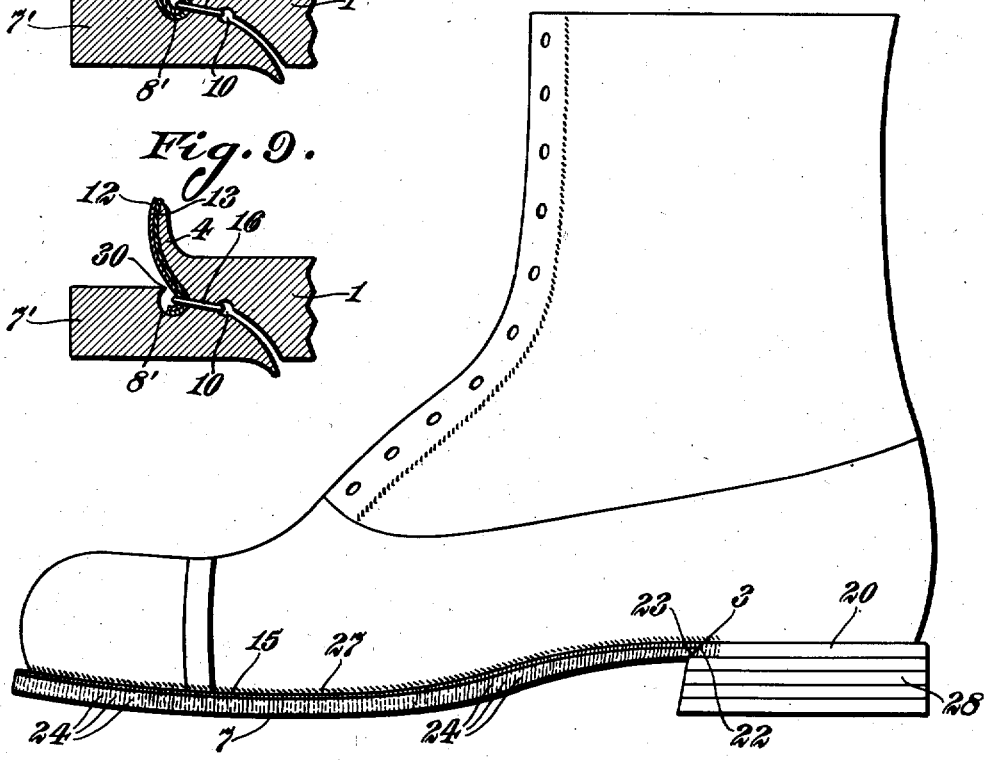
Fig. 9.
Fig. 10.
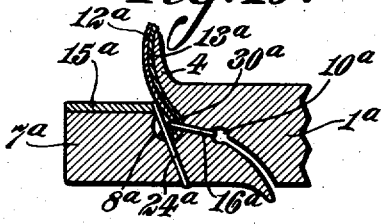
Inventor:
AMOS MADSON,
By John H. Bruninga,
His Attorney.

Reissued May 26, 1925.

Re. 16,082

UNITED STATES PATENT OFFICE.

AMOS MADSON, OF PONTIAC, ILLINOIS, ASSIGNOR, BY MESNE ASSIGNMENTS, TO NORWAY WELT PATENTS TRUST, A TRUST ESTATE.

SHOE AND METHOD OF MAKING THE SAME.

Original No. 1,265,100, dated May 7, 1918, Serial No. 204,079, filed November 26, 1917. Application for reissue filed May 6, 1920. Serial No. 379,424.

*To all whom it may concern:*

Be it known that I, AMOS MADSON, a subject of the King of Norway, and a resident of Pontiac, county of Livingstone, in the State of Illinois, have invented certain new and useful Improvements in Shoes and Methods of Making Same, of which the following is a specification.

The present invention appertains to footwear, and aims to provide a novel and improved construction and assemblage of the component parts of a shoe, boot, sandal or other article of footwear, the term "shoe" being employed herein for convenience, to designate broadly any article of footwear.

One of the objects of the invention is to provide a shoe in which the upper is seamed to the sole in such a manner as to secure a shoe of great strength, adapted to keep its shape and which is comfortable to the foot.

Another object is to provide a shoe in which the seam securing the upper to the sole is arranged in such a manner as be covered, in order to present a neat appearance and a smooth inner foot-supporting surface.

Another object is to provide a shoe in which the upper is secured to the sole at the fore part and heel in such a manner as to secure maximum strength while maintaining a neat appearance.

Another object is to provide a sole which is simple in construction, furnishes strong attachments for the fastening of the upper thereto, and permits such attachments to be made in a simple and efficient manner.

Another object is the provision of a "welt" shoe eliminating the use of a separate insole as customarily employed, and otherwise improving and facilitating the construction and assemblage of parts of the shoe to lessen the cost of production, and at the same time to render the shoe more flexible and efficient.

A further object of the invention is the provision of novel means for joining the upper and its lining with the sole in such a manner as to make a substantial and secure construction.

Another object of the invention is the provision of novel means for uniting the heel, upper and sole to provide an effective and practical construction.

The invention also aims to provide a shoe of the nature indicated, which will permit of repairs being readily made, to resole or apply a new sole to the shoe readily and perfectly, either by stitching, pegging or nailing operations.

Accordingly another object of this invention is to provide a novel method of making a shoe which will accomplish the above objects and so as to cheapen the manufacture and repair thereof.

With the foregoing and other objects in view, which will appear as the description proceeds, the invention resides in the combination and arrangement of parts and in the details of construction hereinafter described and claimed, it being understood that changes can be made in the precise embodiment of the invention herein disclosed, within the scope of what is claimed, without departing from the spirit of the invention.

The invention is illustrated in the accompanying drawings, wherein:

Figure 5 is a cross section on the same lines as in Figure 2 and 3, showing the completed fore part construction.

Figure 6 is a cross section on the line 6—6 of Figure 4 showing the completed heel construction.

Figure 7 is a side elevation of the finished product or shoe.

Figure 8 is a sectional detail showing one of the steps of making a shoe in accordance with another embodiment of this invention.

Figure 9 is similar view showing a further stage of completion of the same.

Figure 10 is a fragmental cross section showing still another embodiment of this invention.

In carrying out the invention, the sole 1 (which in the particular illustrated embodiments of this invention forms an outsole to which the upper and lining are directly attached as hereinafter described) is cut to suitable shape being provided at its rear or heel end with a heel seat 2 of reduced width, forming the shoulders 3 between the shank portion and heel seat. There is thus provided a sole having a marginal extension along the fore part and a marginal recess at the heel.

Figure 1:
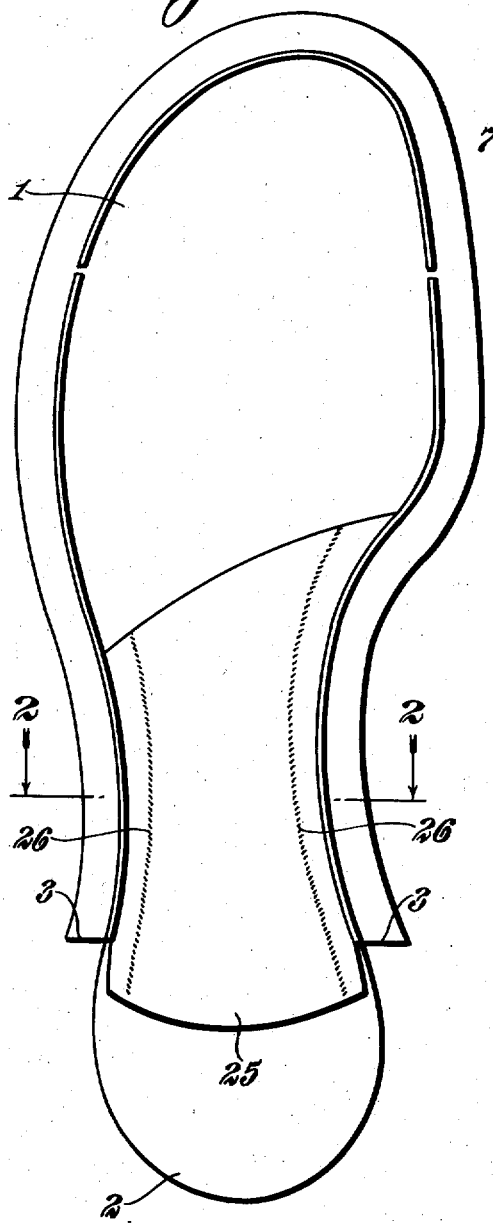
Figure 1 is a plan view of the sole cut ready for the attachment of the upper and showing the shank thereon.
Figure 2:
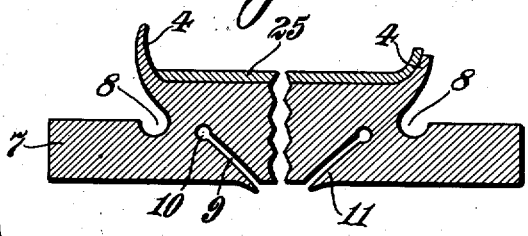
Figure 2 is a cross section on the line 2—2, of Figure 1.

The sole is channeled or slit around its margin from one shoulder 3 to the other, to provide a part which is turned up to provide a flexible upstanding lip 4 along the inner edge of the sole. The lip 4 extends between the shoulders 3 and this leaves a feather 7 of reduced thickness also extending around the fore part from shoulder to shoulder 3. The lip 4 is in the form of a flexible flap which is turned upwardly from the margin of the sole, and provides an upstanding lip inside of and above the feather 7, thereby forming a shoulder at and along the junction of the lip 4 and the feather 7. The lip 4 may terminate in a feather edge as shown at the left, Figure 2, or it may be blunt as shown at the right.

The sole is provided with a groove 8 along the junction of and between the marginal portion or feather 7 of the sole and the lip 4, said groove being co-extensive in length with the feather 7 and lip 4 and extending from one shoulder 3 to the other around the fore part.

The sole is further prepared by cutting a channel 9 upwardly and outwardly therein in its lower surface, said channel being located inwardly of the feather 7 and being co-extensive in length therewith. The channel 9 extends upwardly and outwardly toward the groove 8 and is provided with a groove 10 spaced inwardly of and may be in substantially the same horizontal plane as the groove 8 to receive the stitching forming the inseam. The channel 9 forms a flexible lip 11 underneath the same projecting inwardly.

Figure 3:
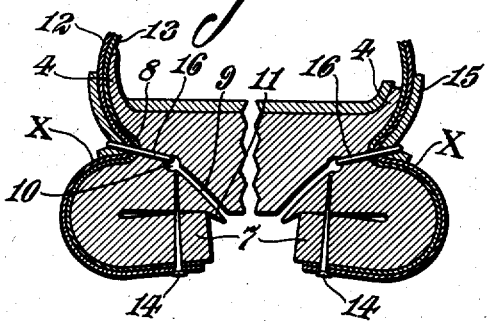
Figure 3 is a cross section on the same line showing the first steps in attaching the upper and sole together at the fore part.
Figure 4:
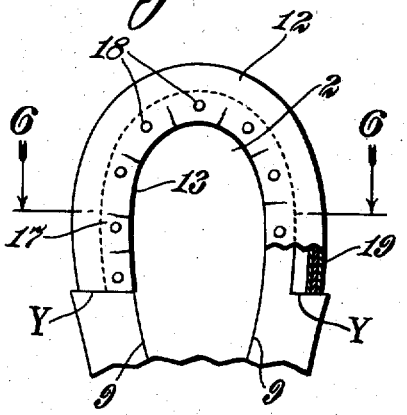
Figure 4 is a fragmental bottom plan view illustrating the attachment of the upper to the heel seat of the sole.

The upper 12 is provided with a lining 13 therein, and in assembling the upper and its lining with the sole, they are placed over a suitable last, shaped or grooved to receive the lip 4. In actual practice the sole is tempered and tacked on the last bottom as is usual in shoe making. The feather 7 is bent or folded back against the bottom surface of the sole, as seen in Figure 3; in actual practice the feather 7 and lip 4 on the tempered sole may be preliminarily turned back, which may be accomplished with any suitable lip turning device well known in the art. The upper (and lining) is then assembled on the last and lasted over the sole and against the feather and lip and the shoulder formed at their junction in a manner accomplished by those skilled in the art. The marginal portions of the upper and its lining are placed snugly around the bend of the feather 7, to overlap said feather, as seen in Figure 3, and are held in place, together with the feather 7, by tacking them to the sole, the lasting tacks 14 extending through the upper, lining and feather 7 and extending into the sole, as seen in Figure 3.

The lasted shoe is now allowed to set as usual and is then ready for seaming together of the upper and the sole.

The seaming may be performed in a usual inseam sewing machine or welter. Accordingly a welt 15 in inverted position, is passed around the upper snugly thereagainst with its lower edge portion at that side of the upper opposite to the groove 8, and the upper or outer edge portion of the welt extending upwardly. The welt, upper, lining and sole are then fastened together by means of stitching 16 or other securing means extending through the welt, upper and lining within the groove 8 and horizontally through the sole between the grooves 8 and 10, the channel 9 permitting of such sewing through the parts as described. The welt and the lasted upper (including the lining) are, therefore, secured to the sole along the shoulder formed between the lip 4 and feather 7 and in and along the groove 8, by an inwardly and downwardly directed seam, the stitches (especially where a chain stitch is used) lying along the groove 10 at the bottom of the channel 9, while the stitches at the welt side press the welt and upper firmly into the groove 8.

The upper and lining are cut off immediately below the welt 15, at the point X, to remove the surplus material, and the feather 7 is released by withdrawing the tacks 14, thus permitting the feather to be moved back into former shape, this being accomplished in any suitable manner, as by a turning or setting device. The stitching or securing means 16 provides an inseam which is covered by the welt 15, and the lower edges of the upper 12 and lining 13 and inner edge of the welt 15, forming a bead which is seated snugly in the groove 8. The inner edge of the welt is thus secured to the sole through the upper and lining from below, and the welt extends upwardly and outwardly over the inseam or securing means to cover the same and provide a neat finish.

The upper 12 and lining 13 are then cut or slit at Y, adjacent to the shoulders 3, whereby the lower marginal portions thereof can be turned along the marginal recess to overlap the bottom surface of the heel seat 2, as at 17, and said marginal portion of the heel or counter portion of the upper is then secured to the heel seat 2 by means of tacks 18, or the like, driven through the portion 17 and into the heel seat. The counter 19, which is disposed between the upper 12 and lining 13, is also fastened to the lower surface of the heel seat by the tacks 18. In practice the lining, counter and upper are beaten down over the heel seat and the fasteners are clinched by the heel plate on the last, the marginal edge of the heel being chamfered as shown in Figure 6.

A lift 20 is then placed against the turned upper portion 17 and heel seat 2 and secured thereto by means of tacks 21 or other securing means driven through the lift and into the heel seat and clinched on the heel plate, thus covering the portion 17. The forward or shank edge of the lift 20 is beveled or chamfered at its upper surface, as at 22, to form a better and stronger connection with the sole, and the beveled surface 22 fits snugly against the sole, the shoulders 3 and heel ends of the welt 15 being beveled, as at 23, to fit the beveled surface 22, thus providing a neat joint at the side edges, where the parts are exposed.

The welt 15 is then turned and sewed down on the feather 7 by means of stitching 24 or other securing means extending through the welt and feather, the seam 24 running around the fore part and also extending through the heel or rear ends of the feather 7, welt 15 and lift 20 where they have the lap or scarf joint, thus uniting said parts together firmly above the breast of the heel. In thus extending the stitching or securing means 24 back far enough, it not only unites the welt and feather 7, but also unites the shank edge of the lift 20 with said feather and welt.

The shank 25 which is placed on the sole 1 (when the same is tacked on the last or after the last has been withdrawn after the application of the welt edge seam 24) is then stitched on the sole by means of stitching 26 or other securing means passing through the shank and sole, said stitching or securing means 26 being within the channel 9 or its groove 10 through which the stitching 16 also extends. The lip 11 is then brought flush with the lower surface of the sole by cementing or other fastening means, and it is preferable to run stitching 27 or other securing means through the upper, lining and lip 4. This makes a secure connection between the lip and vertical portion of the upper above the feather 7, and said lip provides a shoulder or abutment against which the upper is secured. The lip 4 can be made relatively narrow, and pressed down flat as shown in Figure 5, but it can have a feather edge to overlap the lining and receive the pressure of the foot.

Finally, the heel 28, composed of lifts, is fastened by nails, pegs or other securing means to the lift 20 and adjacent parts. This completes the shoe, except for the usual finishing operations which need not be further described.

In the embodiment shown in Figures 8 and 9, the welt 15 is omitted, and the feather 7 is made thicker and the groove 8 therefore deeper. In this embodiment the feather 7′ has a flexible lip 30 projecting inwardly and overhanging the groove 8′, which can be bent back upwardly and outwardly, as seen in Figure 8, to open the groove, when the upper 12 and lining 13 are stitched within the groove 8′, by the stitching 16, as above described. Then, when the upper and lining are trimmed or cut off immediately below the stitching 16, as seen in Figure 9, the lip 30 can spring back into place over the groove, to close the same and provide a neat finish, thus concealing the seam and covering the groove.

In Figure 10 of the drawings, parts hereinbefore described have been designed by numerals previously used, with the suffix "a". In this form of the invention, the welt seam $24^a$ is used to hold the lip $30^a$ and the lining $13^a$ to the sole $1^a$. This construction produces a stronger shoe than that delineated in Figure 9, but its use is optional.

It will be seen, from the foregoing, that the present invention produces a lined "welt" shoe requiring no occasion for the use of an insole, the lip 4 meeting all the demands as an equivalent for an insole. The welt or stitched down process embodying this invention can be used with lips of various forms, or the lips can be cut off when not wanted.

The invention, therefore, accomplishes its objects. The shoe is not only simple in construction but has great strength and is arranged to keep its shape. A strong inseam is provided in view of the fact that this inseam is not through a channel lip but through the body of the sole. However, the seam is so arranged that the inside of the shoe is left smooth and free of tacks. Accordingly this shoe combines the advantageous features of the McKay shoe having great strength of seam, and of the usual Goodyear welt in providing a smooth interior surface and shapeliness. The upstanding lips merge into the upper; accordingly, there is formed a cavity providing a comfortable rest for the foot, providing a cover for the seam and presenting a structure which is neat in appearance. The feather forms a desirable extension, which, when covered by the welt, gives the appearance of a welt shoe. In view of the fact that this welt merges into the upper, a neat appearance is presented. The construction of the heel seat with the feather permits the upper edges to be turned out along the fore part and turned in at the heel, thereby not only providing a strong shoe but also presenting a neat appearance.

The method employed is not only simple and economical, but permits the operations to be performed by machines now in existence without requiring even the provision of extra attachments. Moreover the method follows in a general way the detail operations common in the manufacture of McKay and welt shoes; accordingly the departure from present practice is not radical in the sense as to require reorganization of the factory.

It is obvious that various changes may be made in details of construction and operation without departing from the spirit of this invention; it is, therefore, to be understood that this invention is not to be limited to the specific details shown and described.

Having thus described the invention, what is claimed as new is:

1. In a shoe, a one part sole having an upper channel at its margin and a downwardly opening channel spaced inwardly from the first mentioned channel, an upper having its lower edge fitting in the first mentioned channel, a welt, securing means extending through the welt, upper and sole between said channels, the welt extending upwardly over the securing means and resting on the sole, and securing means fastening the welt on the sole.

2. In a shoe, a sole having its margin cut to provide a wing of reduced thickness and an upturned lip, said sole having a channel between said wing and lip and a second channel spaced inwardly from the aforesaid channel and opening downwardly, an upper resting against said lip, a welt, securing means extending through the welt, upper and sole between said channels, the welt being turned outwardly over said feather, and securing means fastening the welt on said feather.

3. In a shoe, the combination of elements specified in claim 2 and further including securing means extending through the upper and lip to fasten them together.

4. In a shoe, a sole having its margin cut to provide an upper channel and having a channel spaced inwardly from the aforesaid channel and opening downwardly, an upper fitting in the first mentioned channel, securing means fastening the upper to the sole and extending between said channels, a shank on the sole, and securing means fastening the shank on the sole and extending downwardly into the second mentioned channel.

5. In a shoe, a sole having a heel seat, an upper having its counter portion turned under the heel seat, a welt secured to the upper and fitting on the sole in front of the heel seat, a lift secured to the heel seat underneath the turned under portion of the upper, and securing means fastening the welt on the sole and also fastening the shank portion of the lift to the sole.

6. In a shoe, a sole having a heel seat of reduced width providing shoulders, an upper having its counter portion turned under the heel seat, a welt secured to the upper and turned outwardly over the marginal portion of the sole in front of said shoulders, said sole being channeled to accommodate the upper and welt, a lift secured to the heel seat underneath the turned under portion of the upper, the shank edge of the lift and said shoulders of the sole having a lap joint, and securing means fastening the welt on the sole and extending rearwardly to also engage the lift at said joint.

7. In a shoe, a sole having a heel seat of reduced width providing shoulders, and having a marginal channel extending forwardly from said shoulders, an upper having portions fitting in said channel and a portion turned under the heel seat in rear of said shoulders, a welt secured to the upper within said channel and turned outwardly over the sole, a heel lift secured to the heel seat underneath the turned under portion of the upper, the shank edge of the lift having an upper beveled surface, the sole and welt being beveled at said shoulders to overlap said beveled surface of the lift, and securing means fastening the welt to the sole and extending rearwardly to engage through the beveled portion of the lift.

8. A shoe, comprising, a sole having the body thereof formed to provide a thinner feather and an inside lip with a groove along their junction, an upper lasted against said inside lip and said groove, and a line of stitches securing said upper to said sole along and within said groove and from the outside of said upper, adapted to leave said feather extending beyond the attached upper in order to provide an extension edge.

9. A shoe, comprising, a sole having the body thereof reduced to form an external feather and a groove therealong, an upper, a turned welt, a seam securing said welt and upper to said sole and above and in said groove and from the outside of said upper, and a seam for securing the outer edge of said turned welt to said sole.

10. The method of making non-turned shoes, comprising, lasting the upper against a distinct marginal groove formed along the sole and inside of and above a feather thereon, and forcing and securing the lasted upper to the sole along and inside of said groove.

11. The method of making shoes, comprising, turning a feather on the sole over and upon the sole bottom, lasting the upper against the feather, securing the lasted upper and an inverted welt to the sole along and above the feather, turning the welt over the feather, and securing the outer edge of the welt to the edge of the feather.

12. The method of making shoes, comprising, turning a feather on the sole over and upon the sole bottom, lasting the upper against the feather, securing the lasted upper and an inverted welt to the sole along and above the feather, turning back the feather, and turning the welt over the feather.

13. The method of making non-turned shoes, comprising, turning back a feather on the sole bottom to open a distinct marginal groove formed above and inside of the feather, lasting the upper against the feather and securing the lasted upper to the sole along and inside of the groove.

14. The method of making non-turned shoes, comprising, turning back a feather on the sole bottom to open a distinct marginal groove formed above and inside of the feather, lasting the upper against the feather, securing the lasted upper to the sole along and inside of the groove, trimming the secured upper along the groove, and turning back the feather.

15. The method of making shoes, comprising, turning a feather on the sole over and upon the sole bottom, lasting the upper together with its lining against the feather, and securing the lasted upper and lining to the sole along and above the feather.

16. The method of making shoes, comprising, turning a feather on the sole over and upon the sole bottom, lasting the upper together with its lining against the junction of the feather with the sole, and securing the lasted upper and lining to the sole along and against the junction.

17. The method of making shoes, comprising, turning a feather on the sole over and upon the sole bottom, turning a lip inside of and above the feather, lasting the upper together with its lining against the junction of the feather and the lip, and securing the lasted upper and lining to the sole along and against the junction.

18. The method of making shoes, comprising, securing the edge of the upper along the entire fore part of the sole above a feather thereon, turning the edge of the upper inwardly over a marginally reduced part of the sole at the heel, applying a lift to the heel seat over the edge of the turned over upper, and joining the lift with the ends of the feather at the breast.

19. The method of making shoes, comprising, securing the edge of the upper along the fore part to the margin of the sole, turning the edge of the upper inwardly over a marginally reduced part at the heel, applying a lift to the heel seat over the edge of the upper, and joining the lift with the sole margin.

20. The method of making shoes, comprising, securing the edge of the upper along the fore part to the margin of the sole, turning the edge of the upper inwardly over a marginally reduced part of the sole at the heel, applying a lift to the heel seat over the edge of the upper, and joining the lift with the ends of the sole margin at the breast.

Signed at St. Louis, State of Missouri, this 4th day of May, 1920.

AMOS MADSON.